US008631639B2

(12) United States Patent
Garcia-Crespo et al.

(10) Patent No.: US 8,631,639 B2
(45) Date of Patent: Jan. 21, 2014

(54) SYSTEM AND METHOD OF COOLING TURBINE AIRFOILS WITH SEQUESTERED CARBON DIOXIDE

(75) Inventors: Andres Garcia-Crespo, Greenville, SC (US); Lewis Berkley Davis, Jr., Niskayuna, NY (US); George Martin Gilchrist, III, Greenville, SC (US); Amit Toprani, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1277 days.

(21) Appl. No.: 12/413,854

(22) Filed: Mar. 30, 2009

(65) Prior Publication Data
US 2010/0247292 A1 Sep. 30, 2010

(51) Int. Cl.
*F02C 7/16* (2006.01)

(52) U.S. Cl.
USPC ............ 60/39.52; 60/39.19; 60/806; 60/782; 415/115; 415/180

(58) Field of Classification Search
USPC ........ 60/262, 39.182, 39.52, 39.19, 772, 806, 60/782; 415/115, 116, 144, 180; 416/96 R
See application file for complete search history.

(56) References Cited

U.S. PATENT DOCUMENTS

| 2,584,899 | A | * | 2/1952 | McLeod | 415/115 |
|---|---|---|---|---|---|
| 3,736,745 | A | * | 6/1973 | Karig | 60/772 |
| 4,089,550 | A | * | 5/1978 | Denton et al. | 285/276 |
| 4,136,516 | A | * | 1/1979 | Corsmeier | 60/39.091 |
| 4,528,811 | A | * | 7/1985 | Stahl | 60/784 |
| 4,631,914 | A | * | 12/1986 | Hines | 60/775 |
| 6,195,979 | B1 | * | 3/2001 | Fukuyama | 60/806 |
| 6,389,796 | B1 | * | 5/2002 | Mandai et al. | 60/39.182 |
| 6,637,183 | B2 | * | 10/2003 | Viteri et al. | 60/39.182 |
| 7,377,111 | B2 | * | 5/2008 | Agnew | 60/772 |
| 7,516,609 | B2 | * | 4/2009 | Agnew | 60/39.52 |
| 2007/0234729 | A1 | * | 10/2007 | West et al. | 60/772 |
| 2011/0079017 | A1 | * | 4/2011 | Gulen et al. | 60/783 |

* cited by examiner

*Primary Examiner* — Phutthiwat Wongwian
*Assistant Examiner* — Steven Sutherland
(74) *Attorney, Agent, or Firm* — Sutherland Asbill & Brennan LLP

(57) ABSTRACT

A turbine power generation system with enhanced cooling provided by a stream of carbon dioxide from a carbon dioxide source and a method of using a stream of carbon dioxide to cool hot gas path components. The turbine power generating system includes a compressor, a combustor, a turbine, a generator, and at least one shaft linking the compressor and turbine and generator together such that mechanical energy produced from the turbine is used to drive the compressor and the generator. Carbon dioxide that is sequestered from the exhaust of the turbine may be stored and injected back into the turbine to cool hot gas path components of the turbine.

18 Claims, 3 Drawing Sheets

SYSTEM AND METHOD OF COOLING TURBINE AIRFOILS WITH SEQUESTERED CARBON DIOXIDE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is generally in the field of gas turbine power generation systems. More particularly, the present invention is directed to a system and method of cooling turbine airfoils with a stream of carbon dioxide from a carbon dioxide source.

Combustion turbines are often part of a power generation unit. The components of such power generation systems usually include the turbine, a compressor, and a generator. These components are mechanically linked, often employing multiple shafts to increase the unit's efficiency. The generator is generally a separate shaft driven machine. Depending on the size and output of the combustion turbine, a gearbox is sometimes used to couple the generator with the combustion turbine's shaft output.

Generally, combustion turbines operate in what is known as a Brayton Cycle. The Brayton cycle encompasses four main processes: compression, combustion, expansion, and heat rejection. Air is drawn into the compressor, where it is both heated and compressed. The air then exits the compressor and enters a combustor, where fuel is added to the air and the mixture is ignited, thus creating additional heat. The resultant high-temperature, high-pressure gases exit the combustor and enter a turbine, where the heated, pressurized gases pass through the vanes of the turbine, turning the turbine wheel and rotating the turbine shaft. As the generator is coupled to the same shaft, it converts the rotational energy of the turbine shaft into usable electrical energy.

Cooling design plays a very important role in turbine efficiency. Modern gas turbine systems are fired at temperatures that often exceed the melting temperatures of turbine materials. This is done because higher Brayton cycle thermodynamic efficiencies can be gained at higher firing temperatures. In order to operate at these elevated temperatures, cooling technologies must be employed to protect hot gas path components. The turbine blades and vanes are of particular concern because they are directly exposed to the hottest gases. Cooling design of the hot gas path components typically focuses on (1) internal convective cooling, (2) external surface film cooling, (3) material selection, (4) thermal-mechanical design, and (5) selection of coolant fluids. Research and development resources have been dedicated to each of these areas to a varying extent, with coolant selection historically receiving the least amount of consideration. When selecting a coolant fluid, it is important to select a coolant fluid that is capable of performing the needed cooling functionality while having the least negative effect on Brayton cycle efficiency. Compressor bypass air and steam are the most widely used coolant fluids.

Unrelated to cooling design, carbon dioxide sequestration techniques are increasingly being employed in power generating stations. Social and political pressures to reduce emissions of carbon dioxide have been the primary driving forces for the implementation of these processes. Power generating stations that utilize carbon dioxide sequestration incur a significant energy cost related to the carbon dioxide separation and storage. As such, it would be desirable to provide a cost-offsetting use of the sequestered carbon dioxide.

BRIEF SUMMARY OF THE INVENTION

In one aspect, the present invention comprises a turbine power generation system with enhanced cooling provided by a stream of carbon dioxide from a carbon dioxide source. The turbine power generation system comprises a compressor configured to compress air, a combustor configured to combust a mixture of compressed air from the compressor with a fuel to produce an exhaust gas stream including carbon dioxide, a turbine configured to convert thermal energy of said exhaust stream into mechanical energy, a generator configured to convert mechanical energy produced by said turbine into electrical energy, at least one shaft linking the compressor, the turbine, and the generator to allow mechanical energy produced by the turbine be utilized by the generator and said compressor, and a conduit configured to inject a stream of carbon dioxide into the turbine from a carbon dioxide source so as to cool the turbine, the carbon dioxide source comprising carbon dioxide in a concentration of greater than about 75 percent by volume.

In certain embodiments, the turbine power generation system further comprises a reservoir comprising carbon dioxide sequestered from the exhaust stream and the stream of carbon dioxide injected into the turbine comprises the sequestered carbon dioxide.

In another aspect, the present invention comprises a turbine power generation system comprising a compressor configured to compress air, a combustor configured to combust a mixture of compressed air from the compressor with a fuel to produce an exhaust gas stream including carbon dioxide, a turbine configured to convert thermal energy of said exhaust stream into mechanical energy and a conduit configured to inject a stream of carbon dioxide into the turbine from a carbon dioxide source so as to cool the turbine, the carbon dioxide source comprising carbon dioxide in a concentration of greater than about 75 percent by volume.

In yet another aspect the present invention comprises a method for cooling hot gas path components of a turbine power generation system with a stream of carbon dioxide provided from a carbon dioxide source. The method comprises combusting fuel in the combustor of the turbine and injecting a stream of carbon dioxide into said turbine so as to provide cooling to one or more of said hot gas path components, said stream of carbon dioxide provided from a carbon dioxide source comprising carbon dioxide in a concentration of greater than about 75 percent by volume.

DETAILED DESCRIPTION OF THE INVENTION

Figure 1:
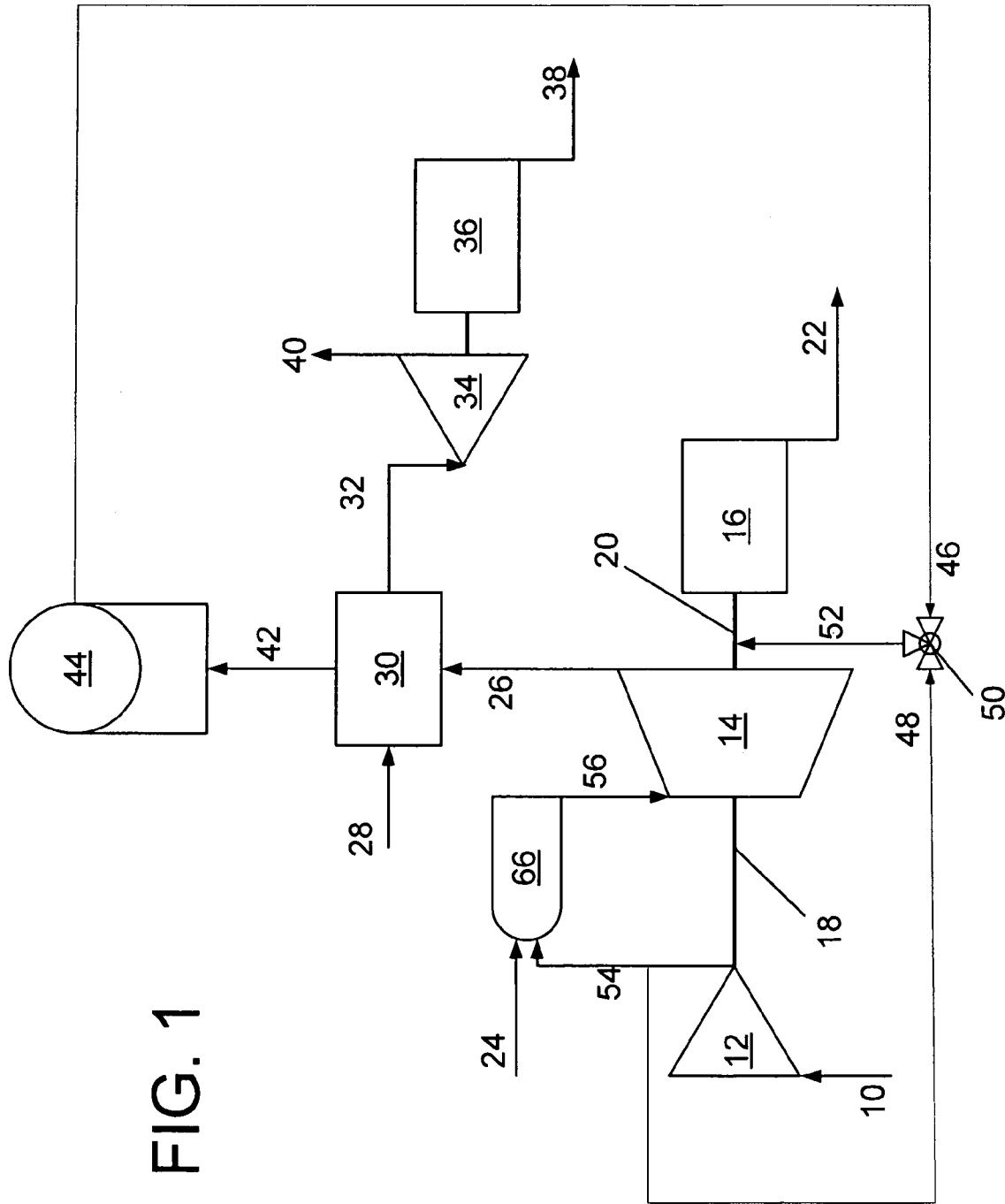
FIG. 1 is a process flow diagram of a turbine power generating system, which is adapted to utilize sequestered carbon dioxide as a turbine cooling source.

FIG. 1 illustrates a turbine power generating system utilizing a stream of carbon dioxide from a carbon dioxide source to cool hot gas path components of the turbine including the buckets and nozzles of the turbine. The turbine power generating system includes an air compressor 12, a combustor 66, a turbine 14, and a electrical generator 16. The Compressor 12, the turbine 14, and the electrical generator 16 may be linked by two shafts 18 and 20. It should be noted that the shafts 18 and 20 may also be the same shaft.

The air 10 entering at an inlet of the air compressor 12 is compressed. The compressed air 54 leaving an outlet of the air compressor 12 may then be supplied to a combustor 66. Those that are skilled in the art will know that in some cases it may be desirable to preheat the compressed air 54 in a recuperator before feeding the compressed air 54 to the combustor 66. The fuel 24 is also supplied to the combustor 66. The flow of the fuel may be controlled by a flow control valve. The fuel is preferably injected into the combustor 66 by an injection nozzle. For high pressure gas turbine applications, it is also advantageous to utilize multiple combustion chambers, or cans, circumferentially situated about the rotational axis of turbine to combust the fuel 24 and the compressed air 54.

Inside the combustor 66, the fuel 24 and the compressed air 54 are mixed and ignited by an igniter to produce an exothermic reaction. After combustion, the hot, expanding gases 56 resulting from the combustion are directed to an inlet nozzle of the turbine 14. When expanded through the turbine 14, the hot gases creates turbine power. The turbine power, in turn, drives the air compressor 12 and the electrical generator 16. The electrical generator 16 uses the mechanical energy to produce electric power 22.

The turbine exhaust gas 26 may then be fed to a steam generator 30. In recuperated systems, the turbine exhaust gas 26 may first be fed through the recuperator to heat the combustion air before the exhaust gas is transmitted to additional heat recovery stages. The turbine exhaust gas 26 fed to the steam generator 30 is used to heat water 28 and produce steam 32. The steam 32 is fed to the steam generator 36, which may be a steam turbine powered generator, to produce additional electric power 38.

Carbon dioxide may then removed from the cooled exhaust gas 42 and stored in a reservoir 44. Carbon dioxide may be removed from the exhaust gas 42 using many different processes. For example, membrane separators or carbon dioxide scrubbers may be used to filter or otherwise separate carbon dioxide from the exhaust gas stream. Because the present method and system may be employed with any carbon dioxide sequestration process, further discussion of carbon dioxide sequestration methods is not provided herein.

In order to allow the combustor 66 to fire at higher temperatures, a coolant 52 is injected into the turbine 14 to cool the hot gas path components of the turbine 14. As used herein, the term "hot gas path components" generally refers to hardware components which are exposed to the hot gases produced by the combustor 66 including, but not limited to, turbine buckets and nozzles. The coolant 52 may be injected at many different locations of the turbine 14. As shown here, and will be described in greater detail subsequently, the coolant 52 may be injected into the shaft 20 where it can be distributed through the inside and out the buckets of the turbine 14.

A three-way valve 50 may be provided to selectively control which cooling fluid will be used as the coolant 52. During startup operations, the three-way valve 50 may be positioned to allow the compressor air 48, a portion of the compressed air 54, to bypass the combustor 66 and be injected directly into the turbine 14. As carbon dioxide is sequestered and stored, the three-way valve 50 may be adjusted to allow the sequestered carbon dioxide 46 to be injected into the turbine 14 in place of the compressor air 48.

Various control systems may be used to coordinate the selection and distribution of the coolant fluid. In one embodiment, a pressure transducer or other sensor is used in the reservoir 44 to determine when enough carbon dioxide has been sequestered to switch to a steady-state, pure carbon dioxide feed. In another embodiment, the position of the three-way valve 50 may be controlled in accordance with a timed startup schedule in which the three-way valve 50 gradually transitions between permitting a pure compressed air feed to be injected into the turbine 14 to permitting a pure sequestered carbon dioxide feed to be injected into the turbine 14. During the transition, a mixture of both feeds may be injected into the turbine 14.

Figure 2:
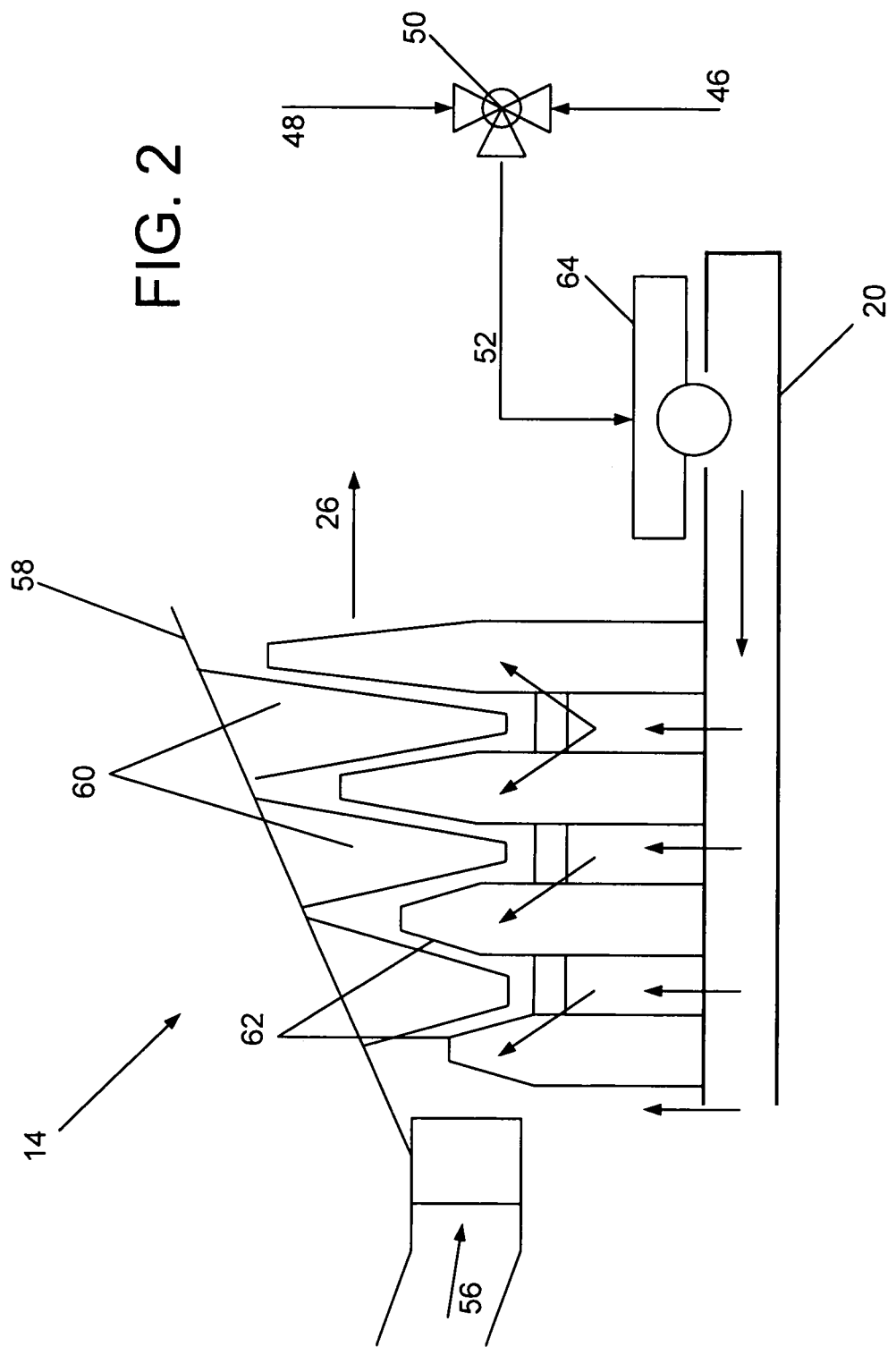
FIG. 2 is a diagram illustrating the injection of sequestered carbon dioxide into the hot gas path components of a turbine.

FIG. 2 illustrates one embodiment of the present invention. In this embodiment, the coolant 52 is injected into the shaft 20 through the gland seal 64. From the turbine shaft 20, the coolant 52 may be distributed throughout the turbine 14 within the casing 58. The coolant 52 passes out of the turbine shaft 20 into the interior of the turbine 14 and out across the buckets 62 and the nozzles 60. This injection method is preferred because it provides for a suitable amount of heat transfer with only a negligible loss in aerodynamic performance.

For conventional cooling with compressor bypass air, an engine may use 20% of its core airflow to cool the hot gas components of the engine. This negatively affects the efficiency, output and even the emissions capability of the engine. Thus, several advantages may be realized by using sequestered carbon dioxide as the coolant 52. One advantage is that the gas turbine engine would no longer need to use compressor bypass air for cooling. As such, all compressor air may then be fed to the combustor. This allows (1) a smaller compressor to be used to reduce "parasitic" energy losses incurred when turning the compressor, and/or (2) more air to be fed to the combustor to produce more powerful combustion. Both of these changes would improve output and efficiency.

Also, adding sequestered carbon dioxide increases the total mass flow of the turbine. This further increases the output of the gas turbine engine. This increase in power would help offset the energy cost of moving the stream of carbon dioxide.

The invention is not limited to the specific embodiments disclosed above. For example, the present invention could be configured without the electrical generator 16. Turbine power would be transmitted and applied directly, as in the case of a mechanically driven application.

Figure 3:
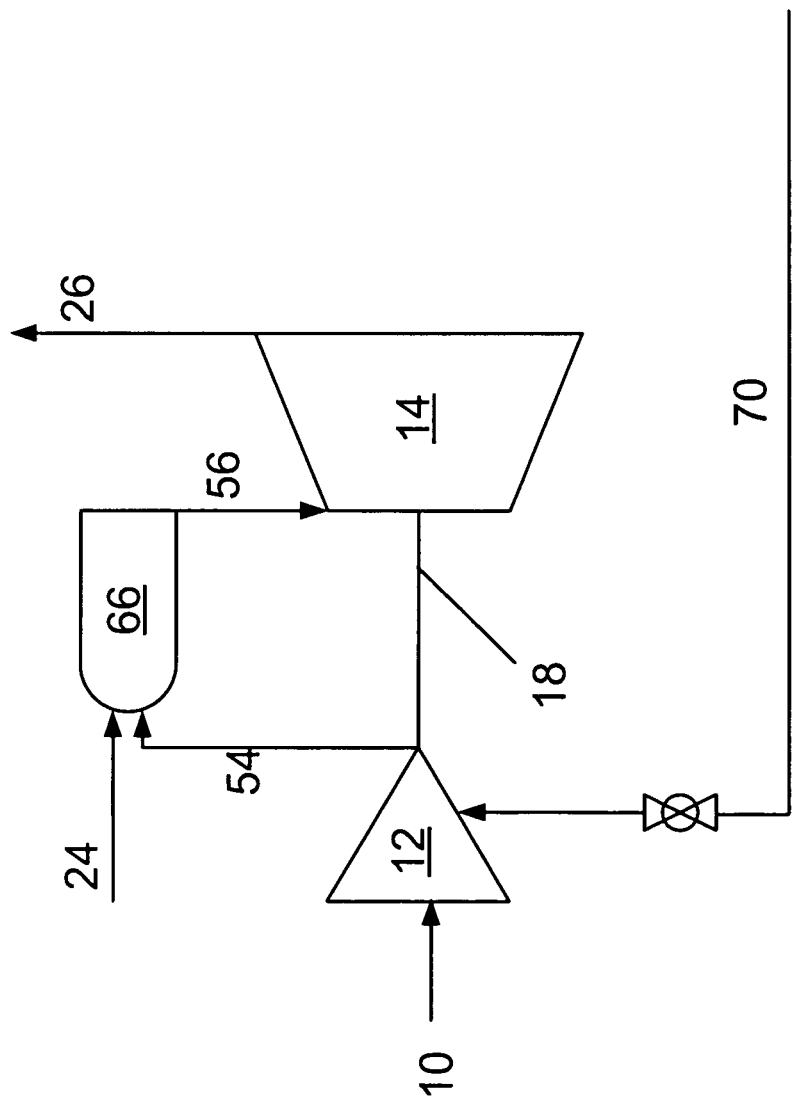
FIG. 3 is a process flow diagram of a turbine power generating system, which is adapted to utilize carbon dioxide as a turbine cooling source.

Also, sequestered carbon dioxide may be injected at various locations to achieve the necessary cooling effect for the hot gas path components. Injection via the gland seal is a preferred option since it allows injection temperatures and pressures to be tuned for each airfoil. Another embodiment of the present invention is illustrated in FIG. 3. In this embodiment, a stream 70 from a carbon dioxide source is injected into the compressor 12 where it combines with the air 10 drawn into the intake of the compressor 12. In yet another embodiment, the stream of carbon dioxide may be injected in the shaft 18 between the compressor 12 and the turbine 14.

Furthermore, the stream of carbon dioxide supplied to the turbine may be provided from various carbon dioxide sources. As used herein, the term "carbon dioxide source" refers to any source comprising carbon dioxide in a concentration greater than about 75% by volume. As such, the term carbon dioxide source encompasses carbon dioxide pipelines, naturally occurring carbon dioxide formations, and reservoirs or streams containing carbon dioxide sequestered from a carbon dioxide generator source.

Modifications and variations of the methods and devices described herein will be obvious to those skilled in the art from the foregoing detailed description. Such modifications and variations are intended to come within the scope of the appended claims.

We claim:

1. A turbine power generation system, comprising:
   a compressor configured to compress air;
   a combustor configured to combust a mixture of compressed air from said compressor with a fuel to produce an exhaust gas stream including carbon dioxide;
   a turbine configured to convert thermal energy of said exhaust stream into mechanical energy, the turbine having a hot gas path for the exhaust stream;
   a generator configured to convert mechanical energy produced by said turbine into electrical energy;
   at least one shaft linking the compressor, the turbine, and the generator to allow mechanical energy produced by the turbine be utilized by the generator and said compressor;
   a conduit configured to inject a stream of carbon dioxide into the hot gas path of the turbine from a reservoir configured to contain carbon dioxide sequestered from said exhaust stream so as to cool the turbine, the carbon dioxide source comprising carbon dioxide in a concentration of greater than about 75 percent by volume.

2. The turbine power generating system of claim 1, said at least one shaft having an interior, wherein said conduit is in fluid communication with said interior of said at least one shaft.

3. The turbine power generation system of claim 2, said turbine having a gland seal, wherein said conduit is in fluid communication with said interior of said at least one shaft through said gland seal.

4. The turbine power generation system of claim 1, said turbine having a gland seal, wherein said conduit is in fluid communication with said turbine through said gland seal.

5. The turbine power generation system of claim 1, wherein said turbine is adapted to distribute the stream of carbon dioxide injected to said turbine to hot gas path components of said turbine.

6. The turbine power generation system of claim 1, said turbine having an interior portion and a plurality of buckets extending outward in a radial direction from said interior portion of said turbine, said turbine adapted to distribute the stream of carbon dioxide injected to said turbine from said interior portion of said turbine to said plurality of buckets.

7. The turbine power generation system of claim 1, further comprising a valve configured to selectively control the flow of the stream of the carbon dioxide and a portion of bypass air compressed by said compressor to said turbine.

8. The turbine power generation system of claim 1, wherein the stream of carbon dioxide comprises carbon dioxide sequestered from the exhaust stream gas stream of the turbine.

9. A turbine power generation system, comprising:
   a compressor configured to compress air;
   a combustor configured to combust a mixture of compressed air from said compressor with a fuel to produce an exhaust gas stream including carbon dioxide;
   a turbine configured to convert thermal energy of said exhaust stream into mechanical energy, the turbine having a hot gas path for the exhaust stream; and
   a conduit configured to inject a stream of carbon dioxide into the hot gas path of the turbine from a reservoir configured to contain carbon dioxide sequestered from said exhaust stream so as to cool the turbine, the carbon dioxide source comprising carbon dioxide in a concentration of greater than about 75 percent by volume.

10. The turbine power generation system of claim 9, said turbine having a shaft and a gland seal sealing said shaft; wherein said conduit is in fluid communication with said turbine through said gland seal.

11. The turbine power generation system of claim 9, said turbine having an interior portion and a plurality of buckets extending outward in a radial direction from said interior portion of said turbine, wherein said turbine is adapted to distribute said stream of carbon dioxide injected to said turbine from said interior portion of said turbine to said plurality of buckets.

12. A method for cooling hot gas path components of a turbine power generation system comprising:
    providing a gas turbine, including
       a compressor configured to compress air;
       a combustor configured to combust a mixture of compressed air from said compressor with a fuel to produce an exhaust gas stream including carbon dioxide; and
       a turbine configured to convert thermal energy of said exhaust stream into mechanical energy, the turbine having a hot gas path for the exhaust gas stream;
    combusting said fuel in said combustor;
    injecting a stream of carbon dioxide into the hot gas path of said gas turbine engine from a reservoir configured to contain carbon dioxide sequestered from said exhaust gas stream so as to provide cooling to one or more of said hot gas path components, said stream of carbon dioxide provided from a carbon dioxide source comprising carbon dioxide in a concentration of greater than about 75 percent by volume.

13. The method of claim 12, said gas turbine further including
    a generator configured to convert mechanical energy produced by said turbine into electrical energy; and
    a shaft linking said compressor, said turbine, and said generator to allow mechanical energy produced by said turbine to be utilized by said generator and said compressor.

14. The method of claim 13, said shaft having an interior, wherein said stream of carbon dioxide is injected into said turbine through said interior of said shaft.

15. The method of claim 12, said turbine having a gland seal, said stream of carbon dioxide injected into said turbine through said gland seal.

16. The method of claim 15, said turbine adapted to distribute said stream of carbon dioxide injected into said turbine to cool hot gas path components of said turbine.

17. The method of claim 12, said turbine having an interior portion and a plurality of buckets extending outward in a radial direction from said interior portion of said turbine, said turbine adapted to distribute said stream of carbon dioxide injected into said turbine from said interior portion of said turbine to said plurality of buckets thereby cooling said plurality of buckets.

18. The turbine method of claim 12, further comprising selectively controlling the flow of said stream of carbon dioxide and a portion of bypass air compressed by said compressor into said turbine.

* * * * *